May 28, 1974  D. SALMON ET AL  3,813,238

MECHANICAL PUDDLER

Original Filed Oct. 9, 1970  2 Sheets-Sheet 1

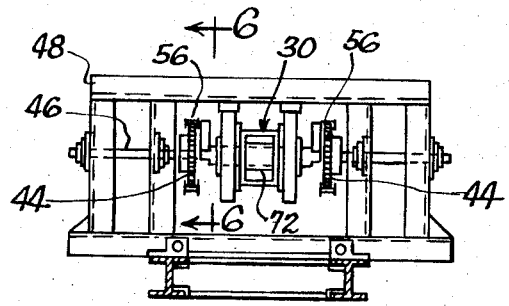
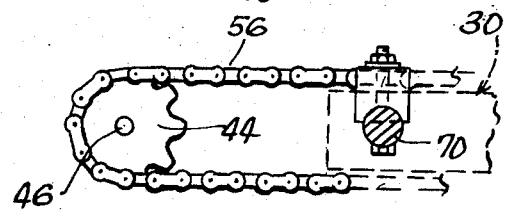
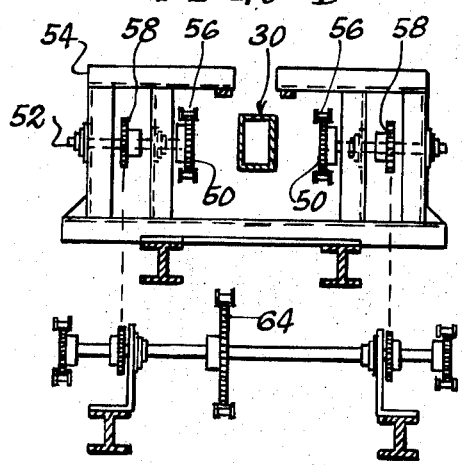
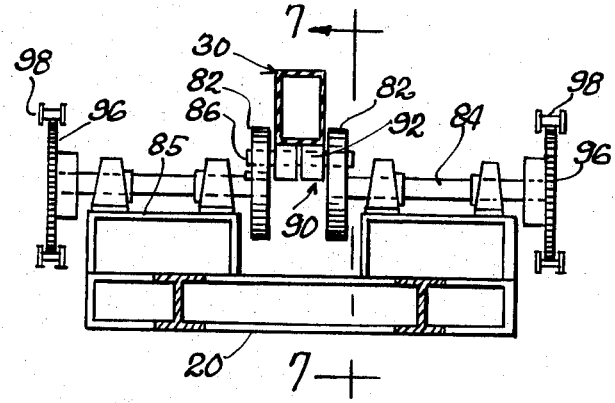
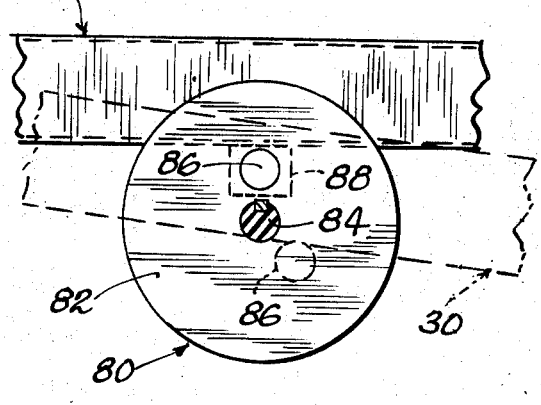

United States Patent Office 3,813,238
Patented May 28, 1974

3,813,238
MECHANICAL PUDDLER
David Salmon, Frankfort, and Edward J. Wierzbicki, Lansing, Ill., Benny Langston, Crown Point, Ind., and Donald W. Beegle, Russellville, Ala., assignors to U.S. Reduction Company
Original application Oct. 9, 1970, Ser. No. 79,561, now Patent No. 3,703,340. Divided and this application May 24, 1972, Ser. No. 256,611
Int. Cl. C22b
U.S. Cl. 75—93 R    2 Claims

ABSTRACT OF THE DISCLOSURE

A mechanical puddler for stirring a melt within a furnace and including an elongated member carried by a frame and having a stirring mechanism connected to a free end thereof with drive means cooperating with the member for moving the paddle in a closed loop having a figure eight configuration. The frame is capable of being raised and lowered relative to the upper surface of the melt and moved parallel to the surface to act as a mechanical skimmer.

---

This is a division of application Ser. No. 79,561, filed Oct. 9, 1970, now U.S. Pat. No. 3,703,340.

BACKGROUND OF THE INVENTION

The present invention relates generally to melting furnaces and more particularly to an improved mechanical puddling and skimming device for stirring and mixing molten materials in a furnace and removing the surface layer.

In the recovery of metal from scrap materials, such as the recovery of aluminum by secondary smelters, it has become customary to utilize what is referred to as a reverberatory well type furnace. This furnace consists of a central heating chamber with wells located on opposite sides of the chamber and in communication therewith. A scrap material containing metallics and non-metallics is combined with a percentage of flux and is fed into the wells for melting. Generally, the heating is accomplished by burners inserted in the sidewalls of the chamber for heating the mass of material within the chamber and the heat is transmitted through the molten mass to the surface of the material in the well. The mixture is stirred and the molten mass separates into a lower layer of molten metal and a slag layer. The upper slag layer is then periodically removed from the melt by a skimming operation.

In order for the scrap materials and flux to be properly melted, it is mandatory that the upper unmelted layer of materials be properly mixed with the molten mass supporting the materials to allow the heat to be transferred to the unmelted materials. For years, this operation has been done manually by one person standing at one end of the well and manipulating a paddle to produce the desired mixing. Generally, the operator moves the paddle in a closed loop figure eight configuration. While such arrangement has proven satisfactory, the increased capacity of furnaces makes the task extremely difficult for the operator to properly mix the materials.

In recent years various types of mechanical devices have been proposed to be substituted for the manual operation. However, to date, the known prior art mechanical devices usually have only one degree of movement at any given time. For example, one such device is disclosed in U.S. Pat. No. 3,258,256 which discloses a mechanism for stirring and mixing a melt within a furnace. While such a device may be adequate for producing the necessary mixing and stirring of the unmelted and melted materials in a furnace, actual tests have shown that such devices are not adequate for conditioning the slag in the well to insure that all of the molten metal is removed therefrom. In fact, tests have shown that the use of mechanical puddlers having single degrees of movement at any given time result in a slag having from 25% to 30% metallics remaining therein.

SUMMARY OF THE INVENTION

The present invention contemplates a mechanical puddling device that is capable of moving a paddle in a configuration closely approximating a manual operation. The paddle of the puddling device not only produces a proper mixing of the materials but also properly conditions the slag to free the molten metal and allow the metal to enter the bottom molten metal layer. To accomplish this the paddle of the mechanical puddling device is simultaneously moved in two different directions to produce a resultant motion in the form of a figure eight pattern which closely approximates the manual motion of a manually operated puddling device.

Stated another way, the present invention contemplates a mechanical puddler for use with a melting furnace to stir a mixture within the furnace and including an elongated member having a stirring mechanism or paddle connected to one end thereof with drive means cooperating with the member for moving the stirring mechanism or paddle in a closed loop having a figure eight configuration. The drive means for the elongated member consists of first means cooperating with one end of the member for moving the member longitudinally or horizontally between first and second extreme positions and second means cooperating with an intermediate portion of said elongated member to simultaneously move the free end of the elongated member between extreme transverse or vertical positions thereby resulting in a closed loop pattern for the paddle connected to the end of the elongated member.

The first drive means for the elongated member includes an endless chain entrained about a pair of spaced sprockets which are rotatably supported on a frame with one end of the elongated member or tube secured to the chain. The endless chain is driven by suitable drive means so as to move the elongated member longitudinally between the first and second extreme positions. Simultaneous to this movement, the second drive means or movable support means cooperates with an intermediate portion of the elongated member and includes an arm supported for rotation about a fixed axis on the frame with a cradle on the arm spaced from the axis for supporting the member.

According to a further aspect of the invention, the two drive means for the elongated member are driven in synchronized relation by common drive means so that the free end of the elongated member and thereby the paddle secured thereto is moved in a closed loop path to simultaneously produce a stirring of the melt and a folding action for proper conditioning of the slag forming part of the melt.

According to another aspect of the invention, the puddler is also capable of being used on a mechanical skimmer. For this purpose, the frame is supported by lift means on a trolley and the trolley is driven to move the paddle parallel to the surface of the melt. The lower edge of the paddle is vertically aligned with the lower surface of the slay layer and held in a fixed position on the frame. Thereafter, the trolley is driven to move the paddle.

Summarizing the method of the present invention, a stirring member is moved in a closed loop configuration to mix and condition the melt, the closed loop motion is periodically interrupted and the stirring member is positioned adjacent the surface of the melt and moved along a path parallel to the surface of the melt to skim the slag layer from the molten material.

BRIEF DESCRIPTION OF SEVERAL VIEWS OF DRAWINGS

FIG. 1 discloses a side elevation view of the mechanical puddling and skimming device constructed in accordance with the present invention;

FIG. 3 is an end view as seen along line 3—3 of FIG. 1;

FIG. 4 is a fragmentary sectional view taken generally along line 4—4 of FIG. 1;

FIG. 5 is a fragmentary vertical sectional view taken generally along line 5—5 of FIG. 1;

FIG. 6 is a vertical sectional view taken generally along line 6—6 of FIG. 3; and FIG. 7 is an enlarged vertical section taken along line 7—7 of FIG. 5.

DETAILED DESCRIPTION

Figure 1:
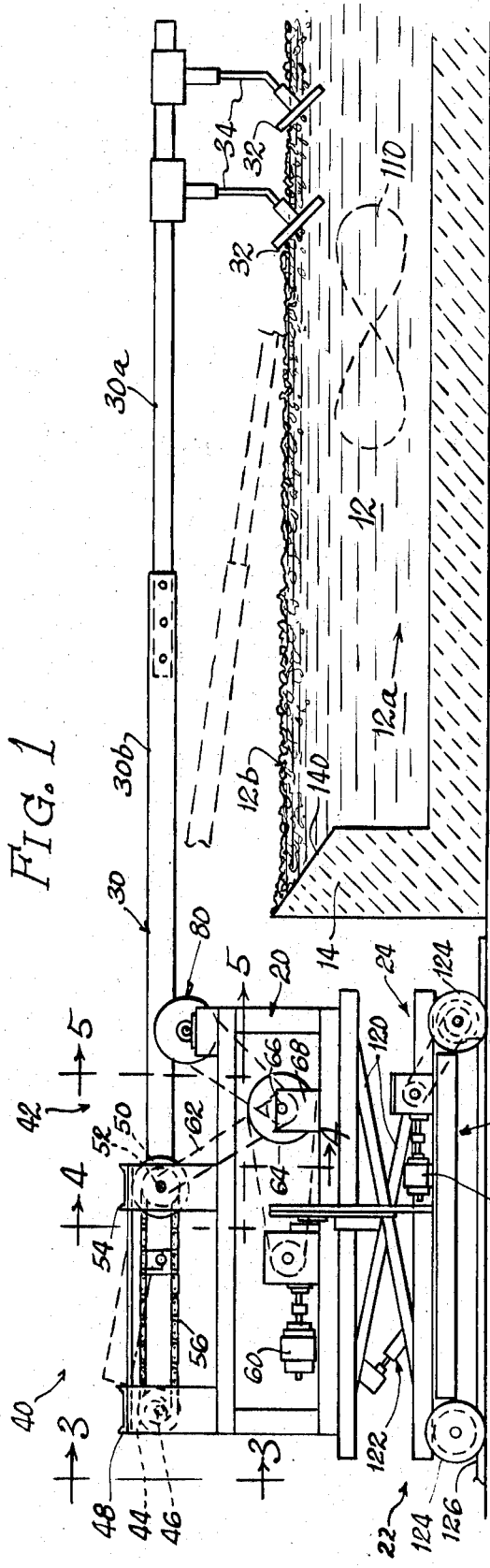

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings discloses a puddling and skimming device 10, constructed in accordance with the present invention, for stirring and conditioning a molten mass 12 within a well of a furnace, defined by vertical walls 14. The puddling device 10 includes a frame 20 carried by a base or trolley 22 through a lift means 24, for a purpose which will be described later.

The mechanical puddling portion of the device 10 includes an elongated member or tube 30 preferably of the telescopic type having an outer tubular member 30a telescopingly receiving an inner tubular member 30b within the telescoping members being adjustably retained by suitable fastening means (not shown). One or more paddles or stirring mechanisms 32 are secured to one end of the elongated member by arms 34.

According to one aspect of the present invention, the mechanical puddler and skimmer 10 includes drive means connected to the elongated member for moving the paddle in a closed loop having figure eight configuration 110. Movement of the paddle in this manner closely approximates the motion a man would impart to a paddle to produce the proper mixing and conditioning of the melt.

The drive means simultaneously produces two degrees of movement of the free end of the elongated member 30 and includes first drive means 40 for moving the member longitudinally between first and second positions and second drive means or movable support means 42 for simultaneously moving the elongated member in a vertical or transverse direction between two extreme positions. Since the respective drive means are duplicated on opposite sides of the elongated member, only one side of each drive means will be described in detail.

The first drive means or moving means 40 includes a first sprocket 44 supported on a shaft 46 which is rotatably mounted on a bracket 48 secured to the frame 20. A second sprocket 50 is likewise supported on a shaft 52 rotated on a bracket 54 secured to frame 20 and an endless chain 56 is entrained over the respective sprockets 42 and 50. The shaft 52 has a sprocket 58 secured thereto which is driven by a suitable power source 60, such as an electric motor, through a chain 62 received on a sprocket 64 carried by a driven shaft 66 supported for rotation on the frame 20 by a bracket 68.

One end of the elongated member 30 (FIGS. 2, 3 and 4) is secured to the endless chains 56 for movement therewith. For this purpose, a shaft or interconnecting member 70 extends between the respective chains and is fixably secured to each of the chains. A sleeve 72 is connected to the one end of the elongated member 30 and is received on the shaft 70. Thus, the motor 60 will move the longitudinal member or tube between first and second extreme positions defined by the respective pairs of sprockets 44 and 50.

Figure 2:
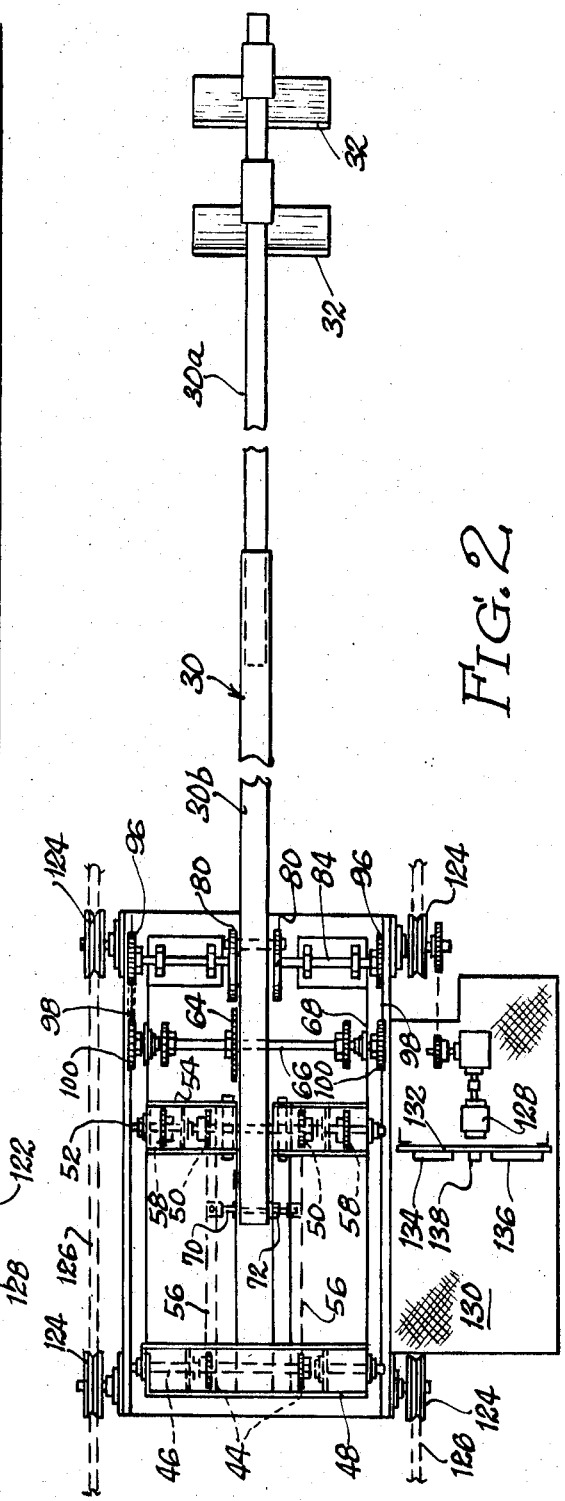
FIG. 2 is a plan view of the device shown in FIG. 1.

The second drive means or movable support means 42 is more clearly shown in FIGS. 2, 6 and 7 and includes a crank 80 consisting of a disc 82 fixedly secured to a shaft 84 which is supported for rotation on a bracket 85 carried by the frame 20. The disc 82 has an eccentric pin or stub shaft 86 which supports an enlarged member 88 and the crank 80 and member 88 defines a tube receiving cradle 90 for receiving and supporting the elongated member.

The respective cranks 80 each have a sprocket 96 secured thereto with an endless chain 98 entrained thereon and on a second sprocket 100 connected to the shaft 66 driven by the motor. Thus, the cranks 80 are driven in synchronized relation to the endless chains 56.

The sizes of the respective sprockets and the length of the chains are selected such that the crank 80 is rotated one full revolution as the shaft 70 is moved from one extreme position adjacent sprocket 44 to the second extreme position adjacent sprocket 50. As the flight of the chains 56 having the shaft 70 secured thereto is moved from the second extreme position to the first, the crank 80 will again be rotated one full revolution. Stated another way, the ratio of the rotation of cranks 80 or vertical movement of the paddle is a multiple of the horizontal movement of the paddle, produced by the chains 56, and is preferably a ratio of 2:1. The driving means will produce simultaneous movement of the elongated member, having its free end portion cantilevered beyond the cranks 80, horizontally and vertically, and the resultant motion of the paddle will be in the form of a closed loop figure eight configuration illustrated by the phantom lines 110 in FIG. 1.

This particular driving motion for the paddle or stirring mechanism 32 will not only produce the proper mixing of the molten mass 12 but will also result in a conditioning of the slag to allow the molten metal to pass from the slag layer into the lower molten metal layer. The slag conditioning comes about as a result of the folding action produced on the molten mass by the paddle as it is traveling in the closed loop figure eight configuration. Furthermore, all of this is accomplished by simple and inexpensive elements forming the driving means for the stirring mechanism, all of which are readily available commercial parts.

If desired, the paddles 32 can be moved in a manner to produce multi-closed loops as the paddles are moved between longitudinal or horizontal extreme positions. This can be obtained by changing the vertical to horizontal motion ratio of 2:1 to a greater ratio, such as 4:1, to produce a greater number of loops.

According to another aspect of the present invention, the device 10 can readily be transformed into a mechanical skimmer to remove the non-metallic or slag layer from the well of the furnace. As was indicated above, the frame or support 20 is carried on a trolley or base 22 by lift means 24. The lift means 24 is in the form of a scissor lift or jack consisting of arms 120, interposed between the frame 20 and the base 22, and a fluid ram 122 having relatively movable elements respectively connected to the frame 20 and the base 22. The fluid ram may be of the single-acting or double-acting type with pressured fluid supplied to the cylinder from a source through a valve (not shown) to extend and retract the piston rod.

The mechanical skimmer further includes means for moving the frame along a path parallel to the upper surface of the melt 12. This latter means is in the form of a drive mechanism for the base. For this purpose, the base 22 is supported on a plurality of wheels 124 guided along tracks 126 with at least one of the wheels 124 driven by a suitable motor 128.

The base 22 further includes an operator's platform 130 having a control panel 132 supported thereon. The control panel includes first means 134 for actuating the motor 60, second means 136 for actuating the ram 122 and third means 138 for driving the motor 128 in either direction.

The operation of the mechanical puddler and skimmer is believed best understood by describing the method of the present invention. A mixture of flux and scrap materials containing metallics and non-metallics is heated in the well to produce a molten mass. During the heating process, the paddles 32 are positioned in the melt and the motor is actuated to move the paddles in closed loop patterns of a general horizontal figure eight configuration 110 to stir and condition the molten mass and separate the molten mass into a lower layer 12a of metallics and an upper layer of non-metallics or slag 12b.

Additional quantities of flux and scrap aluminum may periodically be added to the mass and melted. When the slag layer reaches a predetermined viscosity, the closed loop motion of the paddle is interrupted and the lower edge of the paddle is vertically aligned with the lower surface of the slag layer. Thereafter, the motor 128 is actuated to move the paddle parallel to the upper surface of the melt to remove the slag layer or non-metallics from the melt.

One manner of completely removing the non-metallics from the melt is to form an upwardly and outwardly inclined surface 140 on one wall at a location adjacent the upper surface of the melt. Thus, when the paddle 32 approaches the end 14 having the surface 140 defined thereon, the paddle 32 is moved vertically simultaneous to the horizontal motion, by actuating the ram 122 in synchronized relation to the motor 128, to move the paddle 32 along a path parallel to the inclined surface 140 and force the slag layer from the furnace well.

It will be appreciated that the present invention provides a simple and inexpensive mechanical device which is capable of performing the stirring and conditioning as well as the skimming functions heretofore normally required to be performed manually in a secondary smelting operation. Of course, if desired, the two means for producing horizontal motion on the paddle could be incorporated into a single drive means while the mechanism for raising and lowering the paddles and moving the paddles between extreme vertical positions could also be combined into a single mechanism.

What is claimed is:

1. A method of stirring, conditioning and skimming a molten mass including metallic and non-metallic constituents in a well by means of an elongated member having a paddle adjacent one end thereof located in the well, comprising supporting the elongated member on a support located outside the well, said support having a first supporting element cooperating with the elongated member adjacent the end opposite said paddle and a second supporting element cooperating with an intermediate portion of said elongated member; reciprocating said first supporting element along a path generally parallel to the surface of the mass while raising and lowering said second supporting element to move said paddle in a closed loop path having a figure eight configuration within said mass and to stir and condition said mass so that said non-metallic constituents rise to the surface of said mass; periodically interrupting the movement of said first and second supporting elements and raising said support to locate said paddle adjacent the surface in said mass; and moving the support away from said well along a generally horizontal path while in the raised position to move said paddle toward an edge of said mass and to thereby remove the non-metallic constituents from the mass.

2. A method as defined in claim 1, in which the well has an upwardly and outwardly inclined surface adjacent said edge, the further step of simultaneously producing vertical motion on said paddle when said paddle approaches said surface to move said paddle along a path parallel to said surface.

References Cited
UNITED STATES PATENTS

| | | | |
|---|---|---|---|
| 2,241,806 | 5/1941 | Burkey | 75—78 |
| 3,573,895 | 4/1971 | Ostberg | 75—61 |
| 3,368,805 | 2/1968 | Davey | 75—63 |
| 3,459,536 | 8/1969 | Touzalin | 75—61 |
| 1,630,361 | 5/1927 | Stay | 75—68 |

HYLAND BIZOT, Primary Examiner

P. D. ROSENBERG, Assistant Examiner

U.S. Cl. X.R.
75—63, 68